(12) United States Patent
Xin et al.

(10) Patent No.: US 8,898,027 B2
(45) Date of Patent: Nov. 25, 2014

(54) METHOD AND SYSTEM FOR A COMPREHENSIVE ANALYSIS OF LOW FREQUENCY OSCILLATION

(75) Inventors: Yaozhong Xin, Beijing (CN); Fang Li, Beijing (CN); Jingtao Wu, Beijing (CN); Hongzhu Tao, Beijing (CN); Jianfeng Yan, Beijing (CN); Gang Duan, Beijing (CN); Fang Tian, Beijing (CN); Yu Dong, Beijing (CN); Wei Zhang, Beijing (CN)

(73) Assignee: State Grid Corporation of China, Bejing (CN)

( * ) Notice: Subject to any disclaimer, the term of this patent is extended or adjusted under 35 U.S.C. 154(b) by 202 days.

(21) Appl. No.: 12/996,896

(22) PCT Filed: Sep. 4, 2009

(86) PCT No.: PCT/CN2009/073747
§ 371 (c)(1), (2), (4) Date: Mar. 30, 2011

(87) PCT Pub. No.: WO2010/037298
PCT Pub. Date: Apr. 8, 2010

(65) Prior Publication Data
US 2011/0191048 A1   Aug. 4, 2011

(30) Foreign Application Priority Data

Sep. 27, 2008  (CN) .......................... 2008 1 0168193

(51) Int. Cl.
*G01R 23/00* (2006.01)
*H02J 3/24* (2006.01)
(52) U.S. Cl.
CPC ....................................... *H02J 3/24* (2013.01)
USPC ........................................... 702/75; 700/267

(58) Field of Classification Search
USPC ....................... 702/75, 60; 700/297
See application file for complete search history.

(56) References Cited

U.S. PATENT DOCUMENTS

| | | | |
|---|---|---|---|
| 7,490,013 B2 * | 2/2009 | Wells | 702/60 |
| 2005/0187726 A1 * | 8/2005 | Korba et al. | 702/60 |
| 2008/0177425 A1 * | 7/2008 | Korba et al. | 700/297 |

FOREIGN PATENT DOCUMENTS

| | | |
|---|---|---|
| CN | 101051749 A | 10/2007 |
| JP | 2007-288878 | 4/2006 |
| JP | 2007-325359 | 5/2006 |

OTHER PUBLICATIONS

"Detection of Oscillations in Power Systems using Kalman Filtering Techniques", P. Korba, M. Larsson, C. Rehtanz, IEEE (Jun. 2003).*

(Continued)

*Primary Examiner* — John Breene
*Assistant Examiner* — Stephanie Bloss
(74) *Attorney, Agent, or Firm* — Myers Bigel Sibley & Sajovec, PA

(57) ABSTRACT

A method and a system for a comprehensive analysis of low frequency oscillation. The method includes: firstly, initiating a wide area measurement system WAMS (71) to perform real-time monitoring; transmitting real-time low frequency oscillation information to a dynamic early-warning system (72) periodically; then converting the low frequency oscillation information received by the dynamic early-warning system (72) into an input file for stability calculation with small disturbance, and performing related calculation; finally, transmitting the calculated result back to the wide area measurement system WAMS (71) and a human-machine system interface for output. The system includes: the wide area measurement system WAMS (71), the dynamic early-warning system (72), a system for stability calculation with small disturbance (73) and an output system (74).

3 Claims, 3 Drawing Sheets

(56) References Cited

OTHER PUBLICATIONS

"Self-tuning Controller for Damping of Power System Oscillations with FACTS Devices", R. Sadikovic wt al., Proceedings of the IEEE PES General Meeting 2006 (Jun. 2006).*

"Applications of FACTS Devices for Damping Power System Oscillations", R. Sadikovic et al., Proceedings of the Power Tech conference 2005 (Jun. 2005).*

Xizhao et al., "WAMS Based Statistics and Assessment of Low Frequency Oscillation in Shandong Power Grid", *Automation of Electric Power Systems*; vol. 32, No. 6; Mar. 25, 2008; 1994-2010 China Academic Journal Electronic Publishing House, http://cnki.net; pp. 95-98.

L. Wang et al., "Application of Sparse Eigenvalue Techniques to the Small Signal Stability Analysis of Large Power Systems" IEEE Transactions on Power Systems, 5(4), 635-642, 1990.

* cited by examiner

METHOD AND SYSTEM FOR A COMPREHENSIVE ANALYSIS OF LOW FREQUENCY OSCILLATION

RELATED APPLICATIONS

This application is a 35 U.S.C. §371 national phase application of PCT Application PCT/CN2009/073747, filed Sep. 4, 2009, and published in Chinese on Apr. 8, 2010, as International Publication No. WO 2010/037298 A1, and which claims the benefit of Chinese Patent Application No 200810168193.6, filed Sep. 27, 2008 with the Chinese Patent Office and entitled "Method and system for a comprehensive analysis of low frequency oscillation", the disclosure of each of which is incorporated herein by reference in their entirety.

TECHNICAL FIELD

The present disclosure relates to the field of an analysis of stability of a power system, and in particular to a method and a system for a comprehensive analysis of low frequency oscillation in a power grid.

BACKGROUND

In a modern power system, with the increasing scale of interconnected power grid, the capacity of the remote power transmission is increasing, the low frequency oscillation of the power grid in China occurs frequently. How to perform online real-time measurement and identification on low frequency oscillation rapidly and accurately with a small disturbance analysis method is a critical issue to be addressed in the large scale interconnected power grid. A traditional and classical method for analyzing low frequency oscillation is a method for analyzing eigenvalues with a small disturbance. For an anticipated operation mode of a system, information including low frequency oscillation sub-groups, oscillation relationship, and correlation factors, etc., is derived from an analysis of eigenvalues and eigenvectors of a status equation of operating points. The method for analyzing stability with small disturbance generally makes an offline analysis. However, the oscillation mode of the power system typically varies with a varying operation condition thereof, so accurate online calculation can not be guaranteed from an offline derived result.

A Wide Area Measurement System (WAMS) is a means to monitor the dynamic process of a power system. It can measure variables which are closely related to the transient electromechanical process of a generator rapidly, such as the internal potential, power angle, angular velocity, bus-bar voltage, etc., of the generator, and transmits the information to a centralized station in time to provide the possibility of performing an online analysis and control for the low frequency oscillation. Currently, however, the WAMS in operation and documents concerning WAMS based detection of low frequency oscillation are only limited to a dynamic monitoring function. That is, dynamic curves of a power grid for the voltage relative phase angle, frequency and power are monitored continuously, to real-time calculate and analyze the spectrum of the dynamic curves. Upon detection of presence of a relatively-strong weak damping oscillation component in the range of 0.2 to 2.5 Hz, warning information is transmitted to a dispatching operator, an abnormal zone is marked on a regional map of the power grid, and a data platform is triggered to record current real-time data at a high speed. However, it is impossible to install Phasor Measurement Units (PMUs) at all the nodes of a power system in view of the cost.

Typically, an oscillation characteristic of power at an outlet port of a line or station is derived with the WAMS monitoring function, and therefore it is impossible to determine which specific ones of generators give rise to oscillation. That is, no control measure can be taken against oscillation due to absence of further analytical information of a low frequency oscillation mechanism.

SUMMARY

An object of the disclosure is to provide a method and a system for a comprehensive analysis of low frequency oscillation in combination with an analysis with small disturbance as well as real-time measurement and identification of a power grid.

In order to achieve the object, the present disclosure provides a method for a comprehensive analysis of low frequency oscillation in combination with an analysis with small disturbance as well as real-time measurement and identification of a power grid, which includes the steps of:

1: initiating a Wide Area Measurement System (WAMS) to real-time monitor the dynamic process of a power system;

2: transmitting, by the WAMS, real-time low frequency oscillation information of the monitored system to a dynamic early-warning system periodically;

3: receiving, by the dynamic early-warning system, the low frequency oscillation information transmitted from the WAMS and converting it into an input file of a task for stability calculation with small disturbance;

4: performing stability calculation with small disturbance to derive an eigenvalue and outputting a result file of stability calculation with small disturbance;

5: calculating a damping ratio and an oscillation frequency of real-time low frequency oscillation from the contents of the calculated result file to generate a result file of online calculation with small disturbance; and 6: returning the result of online calculation with small disturbance to the WAMS and a human-machine system interface for output.

The disclosure further provides a system for the comprehensive analysis of low frequency oscillation, which includes:

a Wide Area Measurement System (WAMS) adapted to real-time monitor the dynamic process of a power system and to transmit the monitored real-time low frequency oscillation information periodically;

a dynamic early-warning system connected with the WAMS and adapted to receive the monitored real-time low frequency oscillation information transmitted from the WAMS and to convert it into an input file of a task for stability calculation with small disturbance;

a system for stability calculation with small disturbance connected with the dynamic early-warning system and adapted to perform stability calculation with small disturbance, to output a result file of stability calculation with small disturbance, and to calculate a damping ratio and an oscillation frequency of real-time low frequency oscillation from the calculation result file to generate a result file of online calculation with small disturbance; and an output system adapted to output the result of online calculation with small disturbance.

The disclosure combines the detailed advantages of dynamic data monitoring of the WAMS and the model of the system for stability analysis with small disturbance. Firstly, traditional stability calculation with small disturbance is based upon simulation of offline data, and introduction of dynamic data of the WAMS can avoid effectively data error due to modeling of a dynamic element. Moreover, pertinent frequency information provided by the WAMS can locate rapidly a search range of low frequency oscillation and avoid the problems of a significant calculation workload, occupancy of a memory and slow calculation speed due to calculation of all the eigenvalues. Secondly, it is impossible for the WAMS to configure PMUs at all the stations throughout the network due to an economic constrain, but attention is generally paid to transmission lines and power transmission channels. Even if low frequency oscillation occurring in a line is monitored, it is still difficult to take a corresponding control measure without available further information on an oscillation mechanism. The above problems can be addressed due to introduction of stability calculation with small disturbance. Stability calculation with small disturbance can provide detailed analytical information of an eigenvalue corresponding to an oscillation frequency and group(s) of generators to which attention shall be paid. As can be apparent, stability calculation with small disturbance in combination with the monitoring function of the WAMS enables an online study of the causation of oscillation and a primary factor influencing oscillation as well as a method for suppressing oscillation effectively and provides more comprehensive information for an alarm and analysis of low frequency oscillation of the system.

DETAILED DESCRIPTION

Preferred embodiments of the present disclosure will be described below in detail in combination with the drawings.

Figure 1:
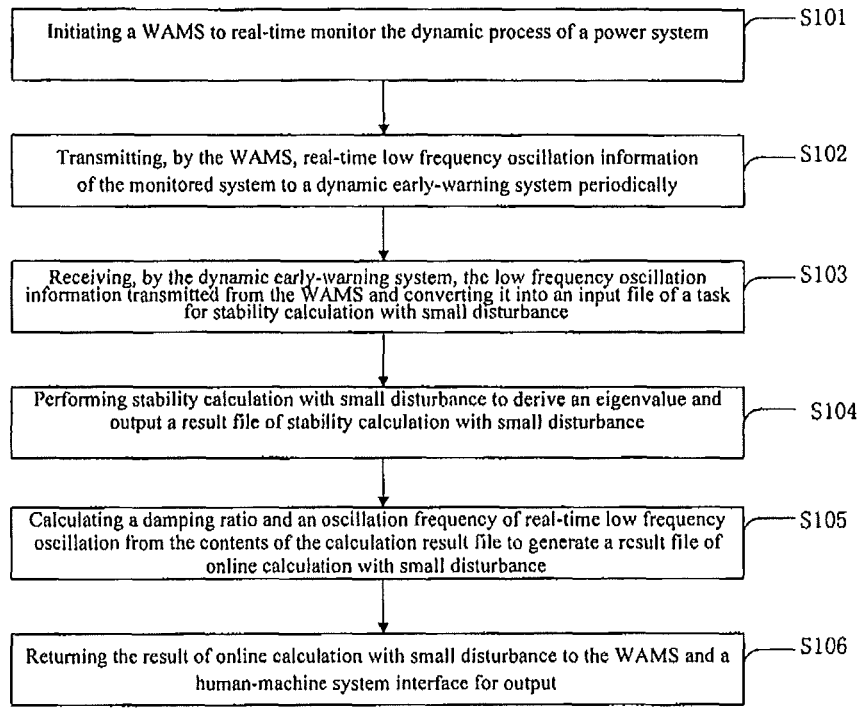
FIG. 1 is a flow chart illustrating a method for a comprehensive analysis of low frequency oscillation according to the disclosure.

FIG. 1 illustrates an operational flow of a method for a comprehensive analysis of low frequency oscillation in combination with an analysis with small disturbance as well as real-time measurement and identification of a power grid according to the disclosure. The operational flow includes the following steps:

S101: initiating A WAMS to real-time monitor the dynamic process of a power system;

S102: transmitting, by the WAMS, real-time low frequency oscillation information of the monitored system to a dynamic early-warning system periodically;

S103: receiving, by the dynamic early-warning system, the low frequency oscillation information transmitted from the WAMS and converting it into an input file of a task for stability calculation with small disturbance;

S104: performing stability calculation with small disturbance to derive an eigenvalue and outputting a result file of stability calculation with small disturbance;

S105: calculating a damping ratio and an oscillation frequency of real-time low frequency oscillation from the contents of the calculated result file to generate a result file of online calculation with small disturbance; and S106: returning the result of online calculation with small disturbance to the WAMS and a human-machine system interface for output.

Where the real-time low frequency oscillation information of the monitored system in the S102 includes information on an oscillation frequency, an oscillation line, etc., as depicted in Table 1.

TABLE 1

Low frequency oscillation information transmitted by WAMS

| Name | Type | Note |
| --- | --- | --- |
| id | int | Serial number of eigenvalue |
| damp | float | Damping ratio |
| osc_freq | float | Oscillation frequency |
| Line_name | Char(32) | Representative Line name |
| FromStation_name | Char(32) | Originating station name |
| ToStation_name | Char(32) | Terminating station name |
| Group1Station_name | Char(32) | Representative node name of group 1, invalid as" |
| Group2Station_name | Char(32) | Representative node name of group 2, invalid as" |
| Program_name | String | calculation program name |
| Time | String | Calculation section time |

Figure 2:
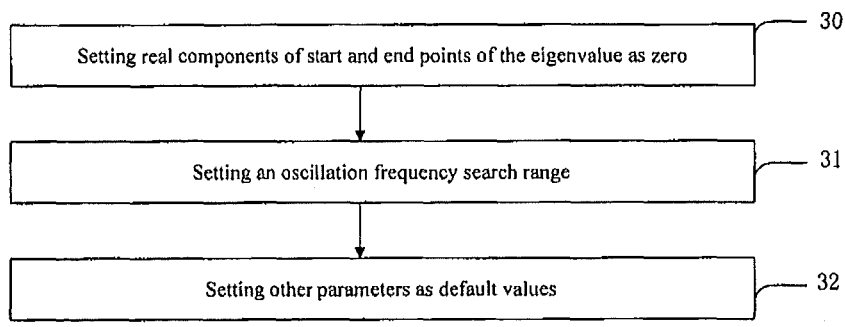
FIG. 2 is a flow chart illustrating a method for converting low frequency oscillation information transmitted from a WAMS into an input file of a task for stability calculation with small disturbance in the step 3) of the method for a comprehensive analysis of low frequency oscillation according to the disclosure.

Further, as shown in FIG. 2, the S103 of converting the low frequency oscillation information transmitted from the WAMS into an input file of a task for stability calculation with small disturbance further includes the following steps:

30) Setting real components of start and end points of the eigenvalue as zero;

31) Setting an oscillation frequency search range;

32) Setting a serial number of an algorithm, an allowed error, the number of iterative initial values, a calculation step length, a total calculated time, the number of eigenvalues derived at each time and an upper limit of the number of iterations in the input file of calculation with small disturbance as default values.

Wherein the frequency search range is generally higher than or equal to 0.5 f and lower than or equal to 1.5 f.

The input file SST.e0 of calculation with small disturbance in the step 32) generally includes a serial number of an algorithm, an allowed error, real and imagery components of start and end points, the number of iterative initial values, a calculation step length, a total calculated time, the number of eigenvalues derived at each time and an upper limit of the number of iterations. The serial number of an algorithm can be selected from a list of methods for calculating an eigenvalue (in Table 2) preset in the system. By default, the system may select automatically the "concurrent iteration method" to derive an eigenvalue, so the serial number of an algorithm is 2. Moreover, by default, an allowed error, the number of iterative initial values, a calculation step length, a total calculated time, the number of eigenvalues derived at each time and an upper limit of the number of iterations in the input file SST.e0 can be provided with respective default values without being set otherwise, and only information on real and imagery components of start and end points in the input file SST.e0 will be modified prior to each initiation of program for stability calculation with small disturbance. In a preferred embodiment of the present disclosure, the contents in the input file SST.e0 are 2, 8, -0.000000, 1.5 f, -0.000000, 0.5 f, 3, 0.010000, 10.000000, 2, 200.

TABLE 2

List of methods for calculating an eigenvalue

| Serial number of algorithm | Method for calculating an eigenvalue |
|---|---|
| 1 | Power method |
| 2 | Concurrent iteration method |
| 3 | Rayleigh quotient iteration method |
| 4 | Modified Arnoldi method |
| 5 | ... |

Figure 3:
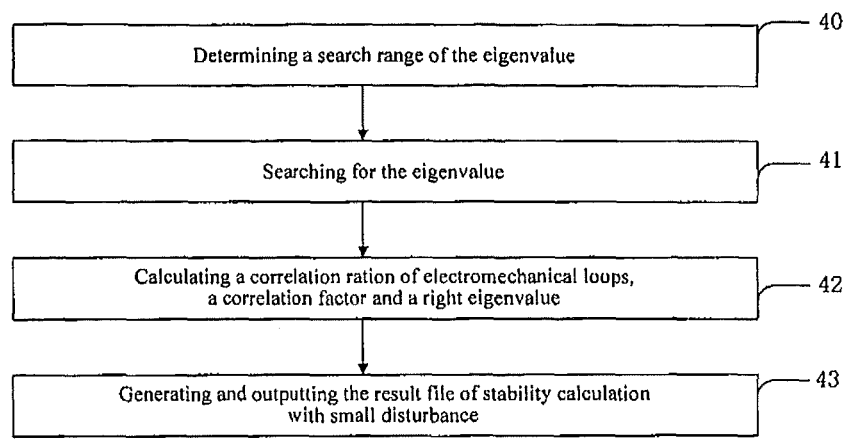
FIG. 3 is a flow chart illustrating stability calculation with small disturbance in the step 4) of the method for a comprehensive analysis of low frequency oscillation according to the disclosure.
Figure 4:
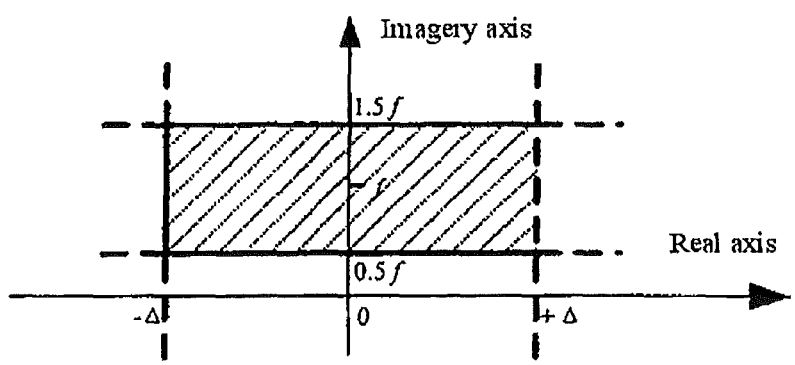
FIG. 4 is a schematic diagram illustrating a set eigenvalue search range according to the disclosure.

As described in the S104, an eigenvalue search range is determined from the input file SST.e0 generated in the S103, so that stability calculation with small disturbance is performed to search for an eigenvalue, as illustrated in FIG. 3. Marked Δ in FIG. 3 is set by the program per se generally in the range of [0.01, 0.05]. In a preferred embodiment of the present disclosure, the inventors derive an eigenvalue with the concurrent iteration method as follows.

A $\in C^{n \times n}$ is assumed with eigenvalues and eigenvectors being respectively $\lambda_i$ and $q_i$, $i=1, 2 \ldots, n$, and $$|\lambda_1| \geq |\lambda_2| \geq |\lambda_3| \geq \ldots \geq |\lambda_n|$$

$$\Lambda = \begin{bmatrix} \Lambda_a & 0 \\ 0 & \Lambda_b \end{bmatrix}$$

where $\Lambda_a = \text{diag}\{\lambda_1 \ldots \lambda_m\}$ and $\Lambda_b = \text{diag}\{\lambda_{m+1} \ldots \lambda_n\}$.

A matrix of right eigenvectors of the matrix A is represented as $Q = [Q_a\ Q_b] = [q_1 \ldots q_m | q_{m+1} \ldots q_n]$.

wherein $q_i$ is an eigenvector corresponding to an eigenvalue $\lambda_i$. A number m of mutually independent initial vectors are assumed:

$$U = [u_1 u_2 \ldots u_m] \in C^{n \times m}$$

The following operation is performed on the foregoing initial vectors:

$$V = AU$$

Since U can be converted into:

$$U = Q_a C_a + Q_b C_b \quad (1)$$

where $C_a \in C^{m \times m}$ and $C_b \in C^{(n-m) \times m}$ are matrixes of coefficients, it is obvious that $$V = AU = Q_a \Lambda_a C_a + Q_b \Lambda_b C_b \quad (2)$$

The proportion of first item on the right of the equation (2) is larger than the proportion thereof in the equation (1). In other words, components belonging to $Q_b$ in respective columns of the matrix V are suppressed to some extent. An eigenvalue in $\Lambda_a$ is further derived in the following iteration process. Firstly, a definition is given:

$$G = U^H U \approx U^H Q_a C_a$$

$$H = U^H V \approx U^H Q_a \Lambda_a C_a$$

wherein the superscript H represents a conjugated transpose operation of a complex matrix. $U^H Q_a$ is assumed as nonsingular, then $$G^{-1} H \approx C_a^{-1} (U^H Q_a)^{-1} U^H Q_a \Lambda_a C_a = C_a^{-1} \Lambda_a C_a$$

In other words, if the matrix B is the solution of GB=H, then:

$$C_a B \approx \Lambda_a C_a$$

The foregoing equation shows that the matrixes $\Lambda_a$ and $C_a$ include approximate eigenvalues and left eigenvectors of the matrix B. If the matrix P is a matrix of right eigenvectors of the matrix B, i.e., $P \approx C_a^{-1}$, then:

$$W = VP \approx Q_a \Lambda_a + Q_b \Lambda_b C_b C_a^{-1}$$

In the foregoing equation, W gives a set of more precise estimated values of right eigenvectors of the matrix A. A set of initial vectors U=W is assumed, and the foregoing calculation is repeated until convergence.

The concurrent iteration method can derive several primary eigenvalues and eigenvectors thereof at each time.

Moreover, stability calculation with small disturbance of the step 4 also derives parameters including a correlation ratio of electromechanical loops, bus-bar name of a generator, a correlation factor, a right eigenvector, etc., relevant to the present disclosure, wherein:

Correlation Ratio of Electromechanical Loops

A correlation ratio $\rho_i$ of electromechanical loops of an eigenvalue $\lambda_i$ is defined as:

$$\rho_i \triangleq \left| \frac{\sum\limits_{x_k \in \Delta\omega\Delta\delta} p_{ki}}{\sum\limits_{x_k \notin \Delta\omega\Delta\delta} p_{ki}} \right| \quad (3)$$

The correlation ratio of electromechanical loops reflects the extent to which the eigenvalue $\lambda_i$ is correlated with the variables $\Delta\omega$ and $\Delta\delta$. In practical application, if the following holds true for an eigenvalue $\lambda_i$, $$\begin{cases} \rho_i \gg 1 \\ \lambda_i = \alpha_i \pm j\omega_i = \alpha_i \pm j2\pi f_i \quad f_i \in (0.2 \sim 2.5) \text{ Hz} \end{cases}$$

then $\lambda_i$ is in a low frequency oscillation mode, i.e., an electromechanical mode.

Correlation Factor

The correlation factor $p_{ki}$ is a physical quantity which is a metric of correlation of the $k^{th}$ status variable $x_k$ with the $i^{th}$ eigenvalue $\lambda_i$:

$$p_{ki} = \left| \frac{v_{ki} \cdot u_{ki}}{v_i^T \cdot u_i} \right| \quad (4)$$

The correlation factor $p_{ki}$ is a comprehensive index which reflects controllability $v_{ki}$ and observability $u_{ki}$ of $x_k$ and $\lambda_i$. In practical application, the correlation factor $p_{ki}$ acts as a ruling principle on selection of a site where a PSS is installed, and can strongly reflect the status variable of which generator is strongly correlated with which oscillation mode, thereby suppressing the corresponding oscillation mode by installing a PSS on the generator preferentially.

Oscillation Mode and Mode Shape

For the matrix $A \in C^{n \times n}$, its eigenvalues $(\lambda_i)$ and eigenvectors $(u_i)$ satisfy the following equation:

$$Au_i = \lambda_i u_i, u_i \neq 0 \ (i=1, 2, \ldots, n) \quad (5)$$

Stability of a system can be determined by an eigenvalue:

(1) A real eigenvalue corresponds to a non-oscillation mode; and (2) A complex eigenvalue always appears in the form of a conjugated pair, i.e., $\lambda = \alpha \pm j\omega$. The real component of an eigenvalue indicates damping of the system against oscillation, and the imagery component thereof indicates an oscillation frequency. $\alpha > 0$ indicates oscillation with an incrementing amplitude where the system is destabilized; $\alpha < 0$ indicates oscillation with a decrementing amplitude where the system is stabilized; and $\alpha = 0$ indicates oscillation with a constant amplitude where the system is in a status of critical stability.

The eigenvectors $u_1$ and $u_2$ reflect a relationship between the magnitude of a relative amplitude and a phase when corresponding oscillation is observed on a status vector X. Physically, a pair of conjugated eigenvalues is referred to as an oscillation mode, and a corresponding eigenvector thereof is referred to as an oscillation mode shape.

Physical Meaning of Right Eigenvector

The eigenvector ($u_i$) defined in the equation (5) is also referred to as a right eigenvector. The status equation $\dot{X} = AX$ is transformed linearly using a matrix composed of the eigenvectors $u_i$, and it can be decoupled.

The eigenvector $u_i$ corresponding to the eigenvalue $\lambda_i$ (i=1, 2, ..., n) reflects a relative amplitude and a phase of the mode $\lambda_i$ observed on a respective status vector. The larger of the module of $u_{ki}$, the relationship between $x_k$ and $\lambda_i$ is more significant, thereby reflecting observability of $x_k$ with respect to $\lambda_i$. Based upon this property of the right eigenvector, we can derive directly from an oscillation mode shape corresponding to an oscillation mode $\lambda_i$ (the right eigenvector $u_i$) that the oscillation mode $\lambda_i$ reflects a destabilized mode among groups of generators.

Definition and Physical Meaning of Left Eigenvector

The vector ($v_i$) satisfying the following equation is referred to as a left eigenvector:

$$v_i^T A = v_i^T \lambda_i \quad (6)$$

That is, $v_i$ is a right eigenvector of the same eigenvalue $\lambda_i$ of the matrix $A^T$ and can be derived based upon this property. The left and right eigenvectors satisfy the following relationship:

$$V^T U = I \quad (7)$$

The left eigenvector reflects controllability of a status vector with respect to an eigenvalue.

Two output files can be generated from the results of stability calculation with small disturbance in the S104 for output, i.e., sst.eg1 and sst.eg2, respectively, wherein:

Output contents of sst.eg1 include a serial number of an eigenvalue, an eigenvalue and a correlation ratio of electromechanical loops.

Output contents of sst.eg2 include a serial number of an eigenvalue, a bus-bar name of a generator, a correlation factor and a right eigenvalue.

Furthermore, as described in the S105, a damping ratio and an oscillation frequency are calculated from the contents of the calculated result files sst.eg1 and sst.eg2 to form a result file of online calculation with small disturbance PMU.OUT, the file structure is depicted in Table 3. The result file PMU.OUT includes detailed information on the damping ratio, a group of oscillation sub-group generators, etc., corresponding to a sensitive frequency measured by the WAMS.

TABLE 3

Result of online calculation with small disturbance

| Name | Type | Note |
| --- | --- | --- |
| id | int | Serial number of eigenvalue |
| egv_real | float | Real component of eigenvalue |
| egv_img | float | Imagery component of eigenvalue |
| damp | float | Damping ratio |
| freq | float | Oscillation frequency |
| Group1_num | Int | Number of representative generators of group 1 |
| Group1_Gen_name1 | Char(32) | Representative generator 1 name of group 1 |
| Group1_Gen_name2 | Char(32) | Representative generator 2 name of group 1 |
| Group1_Gen_name3 | Char(32) | Representative generator 3 name of group 1 |
| Group1_Gen_name4 | Char(32) | Representative generator 4 name of group 1 |
| Group1_Gen_name5 | Char(32) | Representative generator 5 name of group 1 |
| Group2_num | Int | Number of representative generators of group 2 |
| Group2_Gen_name1 | Char(32) | Representative generator 1 name of group 2 |
| Group2_Gen_name2 | Char(32) | Representative generator 2 name of group 2 |
| Group2_Gen_name3 | Char(32) | Representative generator 3 name of group 2 |
| Group2_Gen_name4 | Char(32) | Representative generator 4 name of group 2 |
| Group2_Gen_name5 | Char(32) | Representative generator 5 name of group 2 | wherein:

Damping Ratio Low frequency oscillation typically occurs in a weakly correlated system across a large power grid, and such destabilizing generally results from weak damping and negative damping with an intensity of damping being capable of being determined from a damping ratio of several dominant oscillation modes. All eigenvalues of the system are assumed as:

$$\lambda_i = \alpha_i \pm j\omega_i \, (i=1,2,\ldots,n)$$

The oscillation frequency is $f_i = \omega_i / 2\pi$, and the damping ratio (damping coefficient) $\xi_i$ is defined as:

$$\xi_i = \frac{-\alpha_i}{\sqrt{\alpha_i^2 + \omega_i^2}} \quad (8)$$

$\xi_i \geq 0.1$ indicates strong damping of the system; $\xi_i < 0.03$ indicates weak damping of the system, and $\xi_i \leq 0$ indicates negative damping of the system which may result in oscillation with an incrementing amplitude.

Furthermore, as described in the S106, the result file PMU.OUT derived from online calculation with small disturbance is returned to both the WAMS and the EMS for output.

In an embodiment of the present disclosure, the WAMS provides early-warning information of low frequency oscillation at a time of an interconnected power grid (only the information on an oscillation connecting line and an oscillation frequency in Table 1 as required for calculation with small disturbance is extracted), as depicted in Table 4.

TABLE 4

Low frequency oscillation information provided by the WAMS

| Serial number | Oscillation frequency | Representative line name |
|---|---|---|
| 0 | 0.87 | 0HJb-Song Huo double-circuit line-00P |
| 1 | 0.7 | 0SBb-0 Hou Bei line-00P |
| 2 | 0.68 | 0XAk-0 Xin Lin line-00P |

The foregoing frequency information is written into the SST.e0, and the above frequency ranges are taken as objects of a detailed online analysis by the online analysis with small disturbance to perform an eigenvalue analysis and derive a calculated result with small disturbance (see Table 5). The calculated result demonstrates a low frequency oscillation phenomenon occurring in the foregoing regions (including in- and inter-province oscillation) and further gives the primarily participating generator groups causing low frequency oscillation, the oscillation modes and oscillation damping ratios of corresponding generator groups.

TABLE 5

Result of analysis and calculation with small disturbance

| Serial number | Real component of eigenvalue | Imagery component of eigenvalue | Damping ratio | Oscillation frequency | Oscillation generators of group 1 | Oscillation generators of group 2 |
|---|---|---|---|---|---|---|
| 0 | −0.441422 | 6.15001 | 7.15916 | 0.978678 | 3G of Shuang Yuan, Henan Province | 1G of Dan He, Henan Province |
| 1 | −0.308682 | 5.06635 | 6.08151 | 0.806231 | G2 of Yang Er, Shanxi Province | GG of She Xian, Hebei Province |
| 2 | −0.317443 | 6.71333 | 4.72327 | 1.06832 | G1 of Long Shan, Hebei Province | GA of Bao Xin, Hebei Province |

Figure 5:
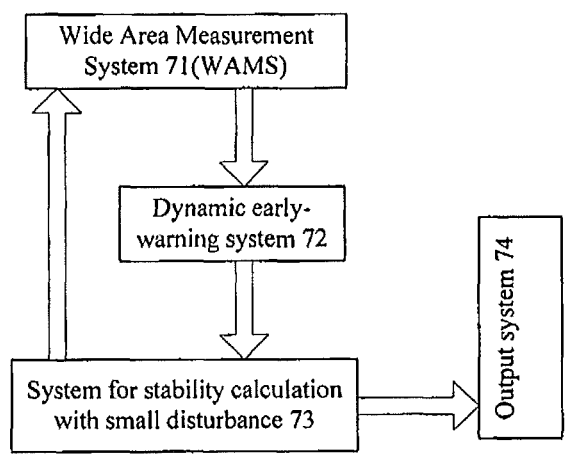
FIG. 5 is a schematic structural diagram illustrating a system for a comprehensive analysis of low frequency oscillation according to the disclosure.

As illustrated in FIG. 5, a system for a comprehensive analysis of low frequency oscillation in combination with an analysis with small disturbance as well as real-time measurement and identification of a power grid according to the disclosure includes:

a Wide Area Measurement System (WAMS) 71 adapted to real-time monitor the dynamic process of a power system and to transmit the monitored real-time low frequency oscillation information periodically;

a dynamic early-warning system 72 connected with the WAMS 71 and adapted to receive the monitored real-time low frequency oscillation information transmitted from the WAMS 71 and to convert it into an input file of a task for stability calculation with small disturbance;

a system for stability calculation with small disturbance 73 connected with the dynamic early-warning system 72 and adapted to perform stability calculation with small disturbance, to output a result file of stability calculation with small disturbance and to calculate a damping ratio and an oscillation frequency of real-time low frequency oscillation from the calculated result file to generate a result file of online calculation with small disturbance; and an output system 74 adapted to output the result of online calculation of the system for stability calculation with small disturbance 73.

The invention claimed is:

1. A method for a comprehensive analysis of low frequency oscillation, comprising the steps of:

initiating a Wide Area Measurement System (WAMS) to real-time monitor the dynamic process of a power system;

transmitting, by the WAMS, real-time low frequency oscillation information of the monitored system to a dynamic early-warning system periodically;

receiving, by the dynamic early-warning system, the low frequency oscillation information transmitted from the WAMS and converting it into an input file of a task for stability calculation with small disturbance;

performing stability calculation with small disturbance based on the input file of low frequency oscillation information transmitted from the WAMS to derive an eigenvalue and outputting a result file of stability calculation with small disturbance;

calculating a damping ratio and an oscillation frequency of real-time low frequency oscillation from the contents of the calculation result file, and calculating a correlation ratio of electromechanical loops, a correlation factor, and a right eigenvector to generate a result file of online calculation with small disturbance; and returning the result of online calculation with small disturbance to the WAMS and a human-machine system interface for output, wherein the real-time low frequency oscillation information of the monitored system comprises information of the oscillation frequency and an oscillation line, the converting into an input file of a task for stability calculation with small disturbance further comprises:

setting real components of start and end points of the eigenvalue as zero;

setting a search range of the oscillation frequency; and setting a serial number of an algorithm, an allowed error, the number of iterative initial values, a calculation step length, a total calculated time, the number of eigenvalues derived at each time, and an upper limit of the number of iterations in the input file of calculation with small disturbance as default values, wherein the algorithm is selected from the group consisting of the power method, concurrent iteration method, Reyleigh quotient iteration method and modified Arnoldi method.

2. The method for a comprehensive analysis of low frequency oscillation of claim 1, wherein the frequency search range is higher than or equal to 0.5 Hz and lower than or equal to 1.5 Hz.

3. A system for comprehensive analysis of low frequency oscillation, comprising:

a Wide Area Measurement System (WAMS) adapted to real-time monitor the dynamic process of a power system and to transmit the monitored real-time low frequency oscillation information periodically;

a dynamic early-warning system connected with the WAMS and adapted to receive the monitored real-time low frequency oscillation information transmitted from the WAMS and to convert it into an input file of a task for stability calculation with small disturbance;

a system for stability calculation with small disturbance connected with the dynamic early-warning system and adapted to perform stability calculation with small disturbance based on the input file of low frequency oscillation information transmitted from the WAMS, to output a result file of stability calculation with small disturbance and to calculate a damping ratio and an oscillation frequency of real-time low frequency oscillation from the calculated result file and to calculate a correlation ratio of electromechanical loops, a correlation factor, and a right eigenvector to generate a result file of online calculation with small disturbance; and an output system adapted to output the result of online calculation with small disturbance, wherein the real-time low frequency oscillation information of the monitored system comprises information of the oscillation frequency and an oscillation line, the converting into an input file of a task for stability calculation with small disturbance further comprises:

setting real components of start and end points of the eigenvalue as zero;

setting a search range of the oscillation frequency; and setting a serial number of an algorithm, an allowed error, the number of iterative initial values, a calculation step length, a total calculated time, the number of eigenvalues derived at each time, and an upper limit of the number of iterations in the input file of calculation with small disturbance as default values, wherein the algorithm is selected from the group consisting of the power method, concurrent iteration method, Reyleigh quotient iteration method and modified Arnoldi method.

* * * * *